United States Patent [11] 3,609,133

[72] Inventors Anthony J. Castro
 Oak Park;
 Eugene J. Miller, Jr., Wheaton, both of Ill.
[21] Appl. No. 798,811
[22] Filed Feb. 12, 1969
[45] Patented Sept. 28, 1971
[73] Assignee Armour Industrial Chemical Company
 Chicago, Ill.

[54] METHOD OF PRODUCING VINYL HALIDE POLYMERS IN THE PRESENCE OF HYDROXYL- OR MERCAPTO-ALKYLSULFOXIDE EMULSIFIERS
13 Claims, No Drawings

[52] U.S. Cl. .................................................. 260/92.1,
 204/159.22, 260/29.6, 260/78.5, 260/87.1,
 260/87.5, 260/87.7, 260/92.8
[51] Int. Cl. ..................................................... C08f 3/22,
 C08f 3/30, C08f 15/08

[50] Field of Search .......................................... 260/92.1,
 92.8 W, 85.5 D, 78.5, 87.1, 87.5, 87.7

[56] References Cited
UNITED STATES PATENTS
2,843,576 7/1958 Dunn et al. ................... 260/92.8 W
3,068,184 12/1962 Noorduyn et al. ............. 260/92.8 W
3,288,859 11/1966 Lyness et al. .................. 260/607 A Primary Examiner—Harry Wong, Jr.
Attorney—Francis W. Young ABSTRACT: An improved process for producing dispersion grade vinyl halide polymers of small particle size through the use of sulfoxide polymerization emulsifiers thereby obviating the necessity for separation of the polymer from water by precipitation or by use of solvents.

METHOD OF PRODUCING VINYL HALIDE POLYMERS IN THE PRESENCE OF HYDROXYL- OR MERCAPTO-ALKYLSULFOXIDE EMULSIFIERS

BACKGROUND OF THE INVENTION

Polyvinyl halides, particularly polyvinyl chlorides, have found wide use as fabric coatings, for production of organosols, plastosols and numerous other industrial uses. To be useful in such applications, the polymer size must be relatively small. Polyvinyl chlorides having a polymeric particle size less than 20 microns are suitable for such uses.

Prior methods for producing vinyl halide polymers of such small particle size have employed emulsion polymerization techniques wherein the vinyl monomer has been emulsified in an aqueous system by use of a suitable emulsifying agent. The very small particle polymer thus formed in the aqueous system required separation from the water by use of precipitation techniques utilizing concentrated salt solutions or by solvent techniques followed by drying. The separation of the polymer from the water phase as found necessary in prior processes has been a time-consuming and separate step in the production of such dispersion grade polymers.

To obtain vinyl halide polymers of particle sizes less than 20 microns it has been necessary to produce the polymers by emulsion polymerization techniques with the attendant separation difficulties due to the small particle size.

Other techniques of polymeric formation such as suspension polymerization form polymers of particle sizes in order of from about 1,000 microns to several milliliters in size and thus are not suitable for the production of dispersion grade polymers.

DESCRIPTION OF THE INVENTION

We have found that by using certain sulfoxides having at least one long chain hydrocarbon group as emulsifiers it is possible to produce dispersion grade polyvinyl halides of small particle size by aqueous emulsion polymerization without the necessity of separate complex steps of precipitation or solvent extraction to isolate the polymer from the water phase as found necessary by prior art methods.

It is therefore an object of our process to provide an improved method for the production of polyvinyl halide polymers having particle sizes of less than 20 microns.

It is a further object of our invention to provide an improved process for the aqueous emulsion polymerization of polyvinyl halides which obviates many disadvantages of prior methods.

It is still another object of our invention to provide a method for formation of vinyl halide polymers having particle sizes less than 20 microns without the necessity of separate chemical steps for separation of the very fine polymers from the aqueous media in which polymerization took place.

The above objects are achieved by our improved process which comprises the emulsion polymerization of polyvinyl halides in an aqueous media using certain sulfoxide emulsifying agents together with a conventional free radical initiator to form an aqueous paste or aqueous emulsion which can be readily separated by mechanical or heating techniques.

Vinyl monomers useful in the process of our invention include the halides vinyl chloride, vinyl fluoride, and vinyl bromide. Other monomers suitable for copolymerization with the above vinyl halides include vinyl stearic acid, vinyl ether, vinyl acetate, vinylidene chloride, vinylidene fluoride, and maleic acid. When the vinyl halide monomer is utilized in conjunction with one of the other monomers to form a copolymer, at least 60 weight percent of the total monomer used should be vinyl halide. A preferred vinyl halide monomer is vinyl chloride to form both the polymer polyvinylchloride and to form the copolymers of vinylidene chloride or vinyl acetate.

Sulfoxides suitable as emulsifiers in the process of our invention include hydroxy sulfoxides and mercapto sulfoxides selected from the compounds represented by the formula:

wherein T is selected from the group consisting of

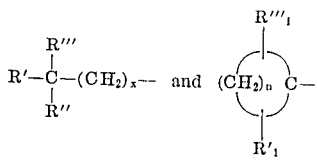

wherein $x$ is an integer of 1 to 5; $R'$ is selected from H and an aliphatic hydrocarbon group having 1 to 20 carbon atoms, $R''$ is selected from H and an aliphatic hydrocarbon group having 1 to 20 carbon atoms, provided $R'$ and $R''$ contain a total of less than 20 carbon atoms; $R'''$ is selected from OH and SH; $n$ is an integer of 3 to 9; and $R'_1$, and $R'''_1$ are selected from the groups set out above for $R'$ and $R'''$ respectively; and wherein $R$ is selected from an aliphatic hydrocarbon group having 6 to 22 carbon atoms and a group having the formula

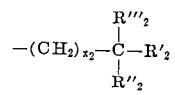

wherein $x_2$, $R'_2$, $R''_2$, and $R'''_2$ are selected from the groups set out above for $x$, $R'$, $R''$ and $R'''$ respectively. All of the aliphatic hydrocarbon groups set forth as $R$, $R'$ and $R''$ may be normal, branched chain, or cyclic.

In one preferred subclass of compounds within the above formulas $R'''$ is OH.

In another preferred subclass of compounds within the above formulas $R'$ and $R''$ are each H, $R'''$ is OH, $x$ is 1, and R is an alkyl group of 6 to 22 carbon atoms.

In a particularly preferred subclass of dihydroxy sulfoxides within the above formula $R'$, $R'_2$, $R''$ and $R''_2$ are each H, $R'''$ and $R'''_2$ are each OH, $x$ is 1, and $x_2$ is 5.

In a preferred cyclic hydroxy sulfoxide within the above formula $n$ is 6, $R'_1$ is H, and $R'''_1$ is an OH group located on the carbon atom alpha to the carbon atom to which the sulfoxide function is attached.

Suitable sulfoxides for use as emulsifiers in the process of our invention include 2-hydroxyethyl hexyl sulfoxide, 2-hydroxyethyl heptyl sulfoxide, 2-hydroxyethyl octyl sulfoxide, 2-hydroxyethyl nonyl sulfoxide, 2-hydroxyethyl decyl sulfoxide, 2-hydroxyethyl undecyl sulfoxide, 2-hydroxyethyl dodecyl sulfoxide, 2-hydroxyethyl tridecyl sulfoxide, 2-hydroxyethyl tetradecyl sulfoxide, 2-hydroxyethyl pentadecyl sulfoxide, 2-hydroxyethyl hexadecyl sulfoxide, 2-hydroxyethyl heptadecyl sulfoxide, 2-hydroxyethyl octadecyl sulfoxide, 2-hydroxyethyl nondecyl sulfoxide, 2-hydroxyethyl eicosyl sulfoxide, 2-hydroxyethyl heneicosyl sulfoxide, 2-hydroxyethyl docosyl sulfoxide, 2-hydroxypropyl hexyl sulfoxide, 2-hydroxypropyl heptyl sulfoxide, 2-hydroxypropyl octyl sulfoxide, 2-hydroxypropyl nonyl sulfoxide, 2-hydroxypropyl decyl sulfoxide, 2-hydroxypropyl undecyl sulfoxide, 2-hydroxypropyl dodecyl sulfoxide, 2-hydroxypropyl tridecyl sulfoxide, 2-hydroxypropyl tetradecyl sulfoxide, 2-hydroxypropyl pentadecyl sulfoxide, 2-hydroxypropyl hexadecyl sulfoxide, 2-hydroxypropyl heptadecyl sulfoxide, 2-hydroxypropyl octadecyl sulfoxide, 2-hydroxypropyl nondecyl sulfoxide, 2-hydroxypropyl eicosyl sulfoxide, 2-hydroxypropyl heneicosyl sulfoxide, 2-hydroxypropyl docosyl sulfoxide, 3-hydroxypropyl hexyl sulfoxide, 3-hydroxypropyl dodecyl sulfoxide, 3-hydroxypropyl hexadecyl sulfoxide, 2-hydroxy-2-methyl-propyl dodecyl sulfoxide, 2-hydroxy-2-methyl-dodecyl dodecyl sulfoxide, 2-hydroxy-2-octyl-dodecyl dodecyl sulfoxide, bis(2-hydroxyethyl) sulfoxide, bis(2-hydroxydodecyl) sulfoxide, 2-hydroxyethyl 2-hydroxypropyl sulfoxide, 2-hydroxyethyl 2-hydroxydodecyl sulfoxide, 2-hydroxyethyl 5-hydroxypentyl sulfoxide, 2-hydroxycyclohexyl dodecyl sulfoxide, 2-hydroxycyclohexyl dodecyl sulfoxide, and the corresponding compounds wherein the mercapto group is substituted for each of the hydroxy groups above.

Especially preferred sulfoxides for use as emulsifiers in our invention include 2-hydroxyethyl dodecyl sulfoxide, 2-hydroxypropyl tetradecyl sulfoxide, 2-hydroxyethyl hexadecyl sulfoxide, and 2-mercaptoethyl dodecyl sulfoxide.

The polymerization of vinyl halides according to the process of our invention may be initiated by chemical or photo initiators known in the art as free radical initiators. Specific chemical initiators which are especially useful in our invention include the aliphatic peroxides such as lauryl peroxide and acetyl peroxide, aryl peroxides such as benzoyl peroxides, hydrogen peroxide, nitriles such as azo-bis-isobutyronitrile, isopropyl peroxy carbonate, isopropyl perchloride and potassium persulfate. Photo initiation such as ultraviolet radiation may be used either alone or in conjunction with initiators such as dialkyl ketones and organic peroxides. Also, high energy ionizing radiation agents such as gamma rays, beta particles, X-rays and other high energy irradiation initiators may be used. The emulsifiers called for by the process of this invention do not appear to interfere with initiator systems and thus many known initiator systems may be used.

The reaction may be conducted by charging a reaction vessel with the initiator and water, addition of the vinyl monomer and other monomers if a copolymer is desired, and the sulfoxide emulsifier. The order of addition of components is not important and may be varied. The polymerization is effected in the sealed reaction vessel with agitation at autogenous pressures. The temperature at which the polymerization is carried out is governed by the type of initiator utilized in the polymerization, for example, some chemical initiators will induce initiation at about 20° C. while other chemical initiators require higher temperatures of about 150° C. Therefore, suitable temperatures range from about 20° C. to about 150° C. Preferred temperatures are from about 40° to 60° C. Agitation is continued until desired polymerization is obtained, in the order of about 75 percent polymer yield being economically satisfactory. The polymerization time is dependent upon temperature and initiator and is generally from about 12 to 24 hours. After polymerization the reaction vessel is vented and the polymer is obtained as an aqueous paste and an aqueous emulsion.

The polymer formed by the process of this invention may be separated from the aqueous phase by physical means as contrasted to the prior necessity of utilizing chemical means for separation. Physical means selected from mechanical and heating means are preferred. The polymer may be readily separated from the aqueous phase by expression, pressure filtration, centrifugation or spray drying. The aqueous products obtained by the process of this invention are suitable for spray drying which has not been found suitable for conventional aqueous emulsion systems.

The process of our invention is carried out utilizing water and monomer in the proportion of from 20 to 55 weight percent monomer to 80 to 45 weight percent water. Preferred proportions of monomer to water are from 30 to 40 weight percent monomer to 60 to 70 weight percent water. It is preferred to use water having a low mineral content to obtain uniform results since the minerals in some waters may react with some initiators used.

From about 0.5 to 15 weight percent, based upon the vinyl halide monomer, of sulfoxide emulsifier is used to carry out the emulsion polymerization of our process. It is especially preferred to use from about 6 to 12 weight percent of the sulfoxide emulsifier.

The amount of chemical initiator employed in our reaction is generally from about 2 to 20 mole percent based upon the moles of monomer reactant. We prefer to use from about 5 to 10 mole percent.

The isolated polymer obtained upon separation from the aqueous paste and aqueous emulsion obtained from the reaction vessel is particularly suitable for further uses requiring polymer particle sizes of under 20 microns. Generally, following the process of our invention, the solid particles are below 5 microns in size.

The following example is presented to illustrate a preferred embodiment of the invention.

EXAMPLE 1

5.0 grams of 2-hydroxyethyl dodecyl sulfoxide and 45.0 grams of vinyl chloride were added to a 300 ml. stainless steel autoclave. 0.6 grams $K_2S_2O_8$ (potassium persulfate) was mixed with 170 ml. deionized water and pumped into the reaction vessel. The temperature was raised to and maintained at 50° C. and the system subjected to constant agitation for 18 hours. Then the reactor was cooled and the unreacted vinyl chloride vented. The contents, a paste of polyvinylchloride in water, was removed and the water expressed with filter paper. The isolated polymer was resuspended in water and examined under a microscope and solid particles under about 2 microns in size were observed. No individual particles over 5 microns in any dimension were observed.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In the process for producing dispersion grade vinyl halide polymers having particle sizes less than 20 microns comprising emulsion polymerization in the presence of a suitable free radical initiator of from about 20 to 55 weight percent vinyl reactant selected from the group consisting of vinyl monomers selected from vinyl chloride, vinyl fluoride, vinyl bromide and the copolymers of said vinyl monomers with a compound selected from the group consisting of vinyl stearic acid, vinyl ether, vinyl acetate, vinylidene chloride, vinylidene fluoride and maleic acid, provided said vinyl monomer is 60 to 100 weight percent of the total vinyl reactant, emulsified in about 45 to 80 weight percent water, the improvement comprising:

emulsifying said vinyl reactant in said water with from about 0.5 to 15 weight percent, based upon said vinyl reactant, of a sulfoxide emulsifier having the formula:

wherein T is selected from the group consisting of

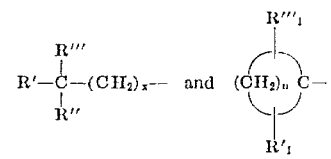

wherein $x$ is an integer of 1 to 5; $R'$ is selected from H and a saturated aliphatic hydrocarbon group having 1 to 20 carbon atoms, $R''$ is selected from H and a saturated aliphatic hydrocarbon group having 1 to 20 carbon atoms, provided $R'$ and $R''$ contain a total of less than 20 carbon atoms; $R'''$ is selected from OH and SH; $n$ is an integer of 3 to 9; and $R'_1$, and $R'''_1$ are selected from the groups set out above for $R'$ and $R'''$ respectively; and wherein R is selected from a saturated aliphatic hydrocarbon group having 6 to 22 carbon atoms and a group having the formula

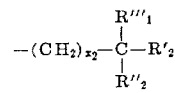

wherein $x_2$, $R'_2$, $R''_2$ and $R'''_2$ are selected from the groups set out above for $x$, $R'$, $R''$ and $R'''$ respectively, polymerizing said vinyl reactant resulting in an aqueous paste of said vinyl polymer, and separating said vinyl polymer from said aqueous paste by physical means.

2. The process of claim 1 wherein said emulsifier is used in an amount of from about 6 to 12 weight percent based upon the vinyl reactant.

3. The process of claim 1 wherein the polymers are separated from said water by physical expression.

4. The process of claim 1 wherein said sulfoxide has R''' as OH.

5. The process of claim 1 wherein T is

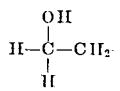

and R is

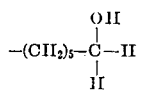

6. The process of claim 1 wherein R is selected from an alkyl group having 6 to 22 carbon atoms.

7. The process of claim 1 wherein T is

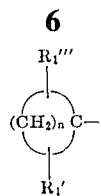

wherein $R'_1$ is H and $R'''_1$ is an OH group located on the carbon atom alpha to the carbon atom to which the sulfoxide function is attached.

8. The process of claim 1 wherein said sulfoxide is selected from the group consisting of 2-hydroxyethyl dodecyl sulfoxide, 2-hydroxypropyl dodecyl sulfoxide, 2-hydroxypropyl hexadecyl sulfoxide, and 2-mercaptoethyl dodecyl sulfoxide.

9. The process of claim 1 wherein said vinyl reactant is selected from the group consisting of vinyl chloride, vinyl fluoride and vinyl bromide.

10. The process of claim 1 wherein the polymers are separated from said water by pressure filtering.

11. The process of claim 1 wherein the polymers are separated from said water by centrifugation.

12. The process of claim 1 wherein the polymers are separated from said water by spray drying.

13. The process of claim wherein T is selected from the group consisting of 2-hydroxy ethyl, 2-hydroxy propyl and 3-hydroxy propyl and R is an alkyl group having 6 to 22 carbon atoms.